United States Patent Office 3,053,838
Patented Sept. 11, 1962

3,053,838
16,17-ACETAL AND KETAL DERIVATIVES OF 16α, 17α-DIHYDROXY-21-HALO STEROIDS OF THE PREGNANE SERIES
Josef Fried, Princeton, N.J., assignor to Olin Mathieson Chemical Corporation, New York, N.Y., a corporation of Virginia
No Drawing. Filed Nov. 7, 1958, Ser. No. 772,404
11 Claims. (Cl. 260—239.55)

This application is a continuation-in-part of my parent applications, Serial No. 677,205, filed August 9, 1957, now abandoned, 714,047, filed February 10, 1958, and now abandoned, and 719,504, filed March 6, 1958, now abandoned.

This invention relates to, and has for its object the provision of, a method of preparing physiologically active steroids; to the physiologically active steroids produced thereby; and to certain new intermediate steroids utilizable in said method.

The final products of this invention include the 16α,17α-acetal (and ketal) derivatives of 21-halo-16α,17α-dihydroxy steroids, and more particularly steroids of the general formula

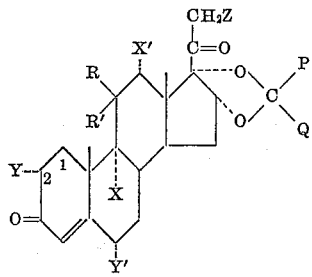

wherein the 1,2-position is saturated or double-bonded; R is hydrogen, R' is β-hydroxy or together R and R' is keto; X and X' are hydrogen, halogen (i.e. fluoro, chloro, bromo and iodo), or lower alkyl, at least one X being hydrogen or lower alkyl; Y is hydrogen or methyl; Y' is halogen (i.e. fluoro, chloro, bromo, and iodo); Z is halogen (i.e. fluoro, chloro, bromo, and iodo); P and Q are hydrogen, lower alkyl, halogenated lower alkyl, monocyclic cycloalkyl, monocyclic aryl, monocyclic aryl lower alkyl, monocyclic heterocyclic, or monocyclic heterocyclic lower alkyl; or together with the carbon atom to which they are joined P and Q are cycloalkyl or monocyclic heterocyclic.

The final products of this invention are prepared by interacting a steroid of the general formula

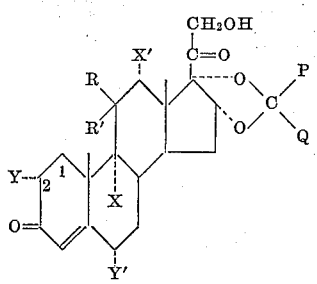

wherein the 1,2-position is saturated or double-bonded;

and R, R', X, X', Y, Y', P and Q are as hereinbefore defined, with an alkane or aryl sulfonyl halide (sulfonyl chlorides being preferred, although other halides such as bromides and iodides may be used) to yield the new 21-alkane (or alkyl) sulfonyloxy intermediates of this invention. Although any alkane (or aryl) sulfonyl chloride may be used, the alkane group is preferably a lower alkane, methanesulfonyl chloride (mesyl chloride) being particularly preferred, and the aryl group is preferably p-tolyl. The reaction is carried out by intermixing the 21-hydroxy steroid and sulfonyl halide under substantially anhydrous conditions and preferably in the cold (e.g. a temperature less than about 20° C.), in the presence of pyridine or other organic tertiary base. As stated before, the reaction results in the new 21-alkane (or aryl) sulfonyloxy compounds of this invention, particularly steroids of the following general formula

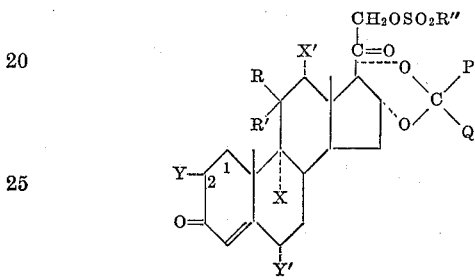

wherein the 1,2 position is saturated or double-bonded; R, R', X, X', Y, Y', P and Q are as hereinbefore defined, and R" is preferably lower alkyl or tolyl.

These 21-alkane (or aryl) sulfonyloxy intermediates are then reacted with a metal halide (such as an alkali metal halide, particularly potassium bifluoride, potassium fluoride, lithium chloride, lithium bromide and sodium iodide) in an organic solvent. The reaction is conducted at an elevated temperature (e.g. at reflux), under substantially neutral conditions. The reaction results in the production of new 21-halo steroids of this invention having the general formula

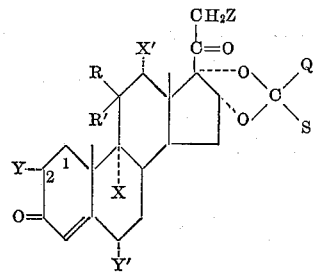

wherein the 1,2 position is saturated or double-bonded; and R, R', X, X', Y, Y', Z, P and Q are as hereinbefore defined.

Among the suitable starting steroids utilizable in the process of this invention may be mentioned the 16α,17α-acetal and ketal derivatives of
6α-halo-16α-hydroxyhydrocortisone (e.g. 6α-fluoro-16α-hydroxyhydrocortisone),
6α-halo-16α-hydroxycortisone,
6α-halo-16α-hydroxyprednisolone,
6α-halo-16α-hydroxyprednisone,
6α,9α-dihalo-16α-hydroxyhydrocortisone (e.g. 6α,9α-difluoro-16α-hydroxyhydrocortisone), 6α,9α-dihalo-16α-hydroxycortisone,
6α,9α-dihalo-16α-hydroxyprednisolone (e.g. 6α,9α-difluoro-16α-hydroxyprednisolone),
6α,9α-dihalo-16α-hydroxyprednisone,
2α-methyl-6α-fluoro-16α-hydroxyhydrocortisone,
2α-methyl-6α-fluoro-16α-hydroxycortisone,
6α-halo-9α-(lower alkyl)-16α-hydroxyhydrocortisone (e.g. 6α-fluoro-9α-methyl-16α-hydroxyhydrocortisone),
6α-halo-9α-(lower alkyl)-16α-hydroxycortisone,
6α-halo-9α-(lower alkyl)-16α-hydroxyprednisolone,
6α-halo-9α-(lower alkyl)-16α-hydroxyprednisone,
6α,9α-dihalo-12α-(lower alkyl)-16α-hydroxyhydrocortisone (e.g. 6α,9α-difluoro-12α-methyl-16α-hydroxyhydrocortisone),
6α,9α-dihalo-12α-(lower alkyl)-16α-hydroxycortisone,
6α,9α-dihalo-12α(lower alkyl)-16α-hydroxyprednisolone (e.g. 6α-chloro-9α-fluoro-12α-methyl-16α-hydroxyprednisolone),
6α,9α-dihalo-12α-(lower alkyl)-16α-hydroxyprednisone,
6α,12α-dihalo-16α-hydroxyhydrocortisone (e.g. 6α,12α-difluoro-16α-hydroxyhydrocortisone and 6α-chloro-12α-fluoro-16α-hydroxyhydrocortisone),
6α,12α-dihalo-16α-hydroxycortisone (e.g. 6α-fluoro-12α-chloro-16α-hydroxycortisone, 6α,12α-dichloro-16α-hydroxycortisone, and 6α,12-difluoro-16α-hydroxycortisone),
6α,12α-dihalo-16α-hydroxyprednisolone (e.g. 6α,12α-difluoro-16α-hydroxyprednisolone, and 6α-chloro-12α-fluoro-16α-hydroxyprednisolone),
6α,12α-dihalo-16α-hydroxyprednisone (e.g. 6α-fluoro-12α-chloro-16α-hydroxyprednisone),
2α-methyl-6α,12α-dihalo-16α-hydroxyhydrocortisone (e.g. 2α-methyl-6α,12α-difluoro-16α-hydroxyhydrocortisone),
2α-methyl-6α,12α-dihalo-16α-hydroxycortisone,
2-methyl-6α,12α-dihalo-16α-hydroxyprednisolone, and
2-methyl-6α,12α-dihalo-16α-hydroxyprednisone, with lower alkanals, such as paraldehyde, propanal, and hexanal; halogenated lower alkanals, such as chloral hydrate trifluoroacetaldehyde hemiacetal and hepta fluorobutanal ethyl hemiacetal; di(lower alkyl)ketones, such as acetone, diethylketone, dibutylketone, methylethylketone, and methylisobutylketone; halogenated di(lower alkyl)ketones, such as 1,1,1-trifluoroacetone; cycloalkanones, such as cyclopentanone, cyclohexanone, suberone, cyclobutanons, and cyclodexanone; mono and dicycloalkyl ketones, such as cyclohexylmethyl ketone and dicyclopropyl ketone; monocyclic aromatic aldehydes, such as benzaldehyde,
halobenzaldehydes (e.g. p-chlorobenzaldehyde and p-fluorobenzaldehyde),
lower alkoxy benzaldehydes (e.g. o-anisaldehyde),
di(lower alkoxy) benzaldehydes (e.g. veratraldehyde),
hydroxybenzaldehydes (e.g. salicylaldehyde),
dihydroxybenzaldehydes (e.g. resorcylaldehyde),
lower alkyl benzaldehydes (e.g. m-tolualdehyde and p-ethylbenzaldehyde),
di(lower alkyl)benzaldehydes (e.g. o,p-dimethylbenzaldehyde),
nitrobenzaldehydes,
acylamidobenzaldehydes (e.g. N-acetylanthranilaldehyde), and
cyanobenzaldehydes;

monocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals and halo, lower alkoxy, hydroxy, lower alkyl, nitro, and cyano derivatives thereof; monocyclic heterocyclic lower alkanals; monocyclic aromatic lower alkyl ketones, such as acetophenone,
propiophenone,
butyrophenone,
valerophenone,
isocaprophenone,
halophenyl lower alkyl ketones (e.g. p-chloroacetophenone and p-chloropropiophenone),
(lower alkoxy)phenyl lower alkyl ketones (e.g. p-anisyl methyl ketone),
di(lower alkoxy)phenyl lower alkyl ketones,
hydroxyphenyl lower alkyl ketones,
dihydroxyphenyl lower alkyl ketones (e.g. resacetophenone),
(lower alkyl)phenyl lower alkyl ketones (e.g. methyl p-tolyl ketone),
di(lower alkyl)phenyl lower alkyl ketones (o,p-xylyl methyl ketone),
nitrophenyl lower alkyl ketones (e.g. p-nitroacetophenone),
acylamidophenyl lower alkyl ketones (e.g.acetylanilines), and
cyanophenyl lower alkyl ketones;

benzophenone, and mono or bis substituted halo, lower alkoxy, hydroxy, lower alkyl, nitro, acylamido and cyano derivatives thereof; monocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoyl furan, and 2-acetylthiophene; monocyclic heterocyclic lower alkanones; and monocyclic heterocyclic ketones, such as alloxan.

The starting steroids can be prepared by the methods disclosed in my U.S. applications, Serial No. 677,205, filed August 9, 1957, now abandoned; 753,401, filed August 6, 1958; and 764,495, filed October 1, 1958. In those cases wherein the 16α-hydroxy steroid employed in the acetalization or ketalization process of these applications is new, it can be prepared microbiologically from the corresponding 16-unsubstituted steroids by action of *Streptomyces roseochromogenus*, for example, in accordance with the method described in the U.S. Patent No. 2,855,343, granted October 7, 1958.

All of the final 21-halo products of this invention are physiologically active substances which possess glucocorticoid and anti-inflammatory activity and hence can be used topically in lieu of known glucocorticoids and anti-inflammatory agents such as hydrocortisone in the treatment of skin conditions such as dermatitis, sunburn, neurodermatitis, eczema, and anogenital pruritus.

The following examples are illustrative of the invention (all temperatures being in centigrade). The first four examples are directed to and illustrate methods for the preparation of the intermediate 21-alkane (or aryl) sulfonyloxy derivatives. The following examples illustrate methods for the preparation of the 21-halo final products of this invention.

EXAMPLE 1

*Triamcinolone Acetonide 21-Mesylate*

To a solution of 1 g. of triamcinolone acetonide in 10 ml. of anhydrous pyridine is added at 0° 1 ml. of methanesulfonyl chloride. After two hours at 0° ice water is added and the precipitated mesylate is removed by filtration. The precipitate is washed thoroughly with water and dried in vacuo, and recrystallized from acetone-hexane. The pure mesylate has the following properties: M.P. about 248–250° (dec.) or 286–287° (dec.) (polymorphie forms). $[\alpha]_D^{23}+92°$ (c., 1.12 in CHCl$_3$).

*Analysis.*—Calcd. for $C_{24}H_{31}O_8SF$ (498.55): C, 57.81; H, 6.27; F, 3.81; S, 6.43. Found: C, 57.87; H, 6.20; F, 3.83; S, 6.33.

Similarly, by substituting aryl sulfonyl chlorides or other lower alkanesulfonyl chlorides for the methane sulfonyl chloride in the procedure of Example 1, the corresponding 21-arylsulfonyloxy and 21-alkanesulfonyloxy derivatives are formed. Thus, p-toluenesulfonyl chloride, ethanesulfonyl chloride and propanesulfonyl chloride yield triamcinolone 21-p-toluenesulfonate, triamcinolone acetonide 21-ethanesulfonate and triamcinolone acetonide 21-propanesulfonate, respectively.

EXAMPLE 2

16α-Hydroxy-9α-Fluorohydrocortisone Acetonide 21-Mesylate

To a solution of 1.5 g. of 16α-hydroxy-9α-fluorohydrocortisone acetonide in 15 ml. of dry pyridine is added at 0°, 1.5 ml. of methanesulfonyl chloride. After standing in the refrigerator for 2½ hours excess methanesulfonyl chloride is destroyed by the addition of a small amount of ice, after which ice-water is added slowly to precipitate the reaction product. After ½ hour in the refrigerator the material is filtered off, washed thoroughly with water and dried in vacuo. The resulting crude material after recrystallization from acetone-hexane gives the pure 21-mesylate of the following properties: M.P. about 225–227° (dec.); $[\alpha]_D^{23}+112°$ (c. 0.5 in chlf.);

$\lambda_{max.}^{Nujol}$ 2.86; 2.94; 5.76; 5.90; 5.96; 6.14μ

Analysis.—Calcd. for $C_{25}H_{35}O_8FS$ (500.56): C, 58.35; H, 6.85; S, 6.23. Found: C, 58.18; H, 6.82; S, 6.05.

EXAMPLE 3

6α-Fluorotriamcinolone Acetonide 21-Mesylate

Following the procedure of Example 2 but substituting 1.5 g of 6α-fluorotriamcinolone acetonide for the 16α-hydroxyfluorohydrocortisone acetonide, there is obtained 6α-fluorotriamcinolone acetonide 21-mesylate.

EXAMPLE 4

6α-Chlorotriamcinolone Acetonide 21-Mesylate

Following the procedure of Example 2 but substituting 1.5 g. of 6α-chlorotriamincinolone acetonide for the 16α-hydroxyfluorohydrocortisone acetonide, there is obtained 6α-chlorotriamcinolone acetonide 21-mesylate.

Similarly, but substituting other 16α,17α-acetals or ketals for the triamcinolone acetonide in Example 1 or the 9α-fluoro-16α-hydroxyhydrocortisone acetonide in Example 2, the corresponding 21-mesylates are formed. Thus, triamcinolone acetophenone, 16α,17α-(2'-butylidene), 16α,17α-(2'-butylidene) 6α-fluorotriamcinolone, 16α,17α-(4'-methyl-2'-pentylidene) 6α-fluorotriamcinolone, 16α,17α-cyclohexylidene 6α-fluorotriamcinolone, 16α,17α-ethylidene 6α-fluorotriamcinolone, 6α,9α-difluoro-16α-hydroxyhydrocortisone acetonide, 6α-fluoro-9α-methyl-16α-hydroxyprednisolone acetonide, 6α,9α-difluoro-12α-methyl-16α-hydroxyhydrocortisone acetonide, 6α,9α-difluoro-12α-methyl-16α-hydroxyprednisolone acetonide, 6α-fluorotriamcinolone acetophenone, 6α-fluoro-16α-hydroxyhydrocortisone benzaldehyde, 6α-fluorotriamcinolone 16α,17α-alloxan, 6α-fluorotriamcinolone dicyclopropyl ketone, 6α-fluoro-12α-chloro-16α-hydroxycortisone acetonide, 6α,12α-dichloro-16α-hydroxycortisone acetonide, 6α,12α-difluoro-16α-hydroxycortisone acetonide, 6α-fluoro-12α-chloro-16α-hydroxyprednisone acetonide, 6α,12-difluoro-16α-hydroxyprednisolone acetonide, 6α,12α-difluoro-2α-methyl-16α-hydroxyhydrocortisone acetonide, 6α-fluoro-12α-chloro-16α-hydroxycortisone 16α,17α-chloral, 16α,17α-(1,1,1-trifluoroisopropylidene) 6α-fluoro-12α-chloro-16α-hydroxycortisone, and 6α,12α-difluoro-16α-hydroxyhydrocortisone benzaldehyde yield their respective 21-mesylate derivatives.

EXAMPLE 5

21-Iodo-9α-Fluoro-Δ¹,⁴-Pregnadiene-11β,16α,17α-Triol-3,20-Dione 16α,17α-Acetonide A solution of 500 mg. of triamcinolone acetonide 21-mesylate and 1.5 g. of sodium iodide in 15 ml. of acetone is refluxed for 40 hours. The reaction mixture is then diluted with water and the crystals filtered off and dried in vacuo. After recrystallization from acetone-hexane, pure 21-iodo-21-desoxytriamcinolone acetonide has the following properties: M.P. about 176–178° (dec.); $[\alpha]_D^{23}+13°$ (c. 1.12 in $CHCl_3$).

Analysis.—Calcd. for $C_{24}H_{30}O_5FI$ (544.40) C, 52.94; H, 5.55; I, 23.31. Found: C, 52.31; H, 6.02; I, 22.69.

EXAMPLE 6

21-Iodo-9α-Fluoro-Δ⁴-Pregnene-11β,16α,17α-Triol-3,20-Dione 16α,17α-Acetonide

A solution of 250 mg. of 9α-fluoro-16α-hydroxyhydrocortisone 16α,17α-acetonide 21-mesylate and 750 mg. of sodium iodide in 7 ml. of acetone is refluxed for 40 hours, the resulting reaction mixture diluted with water and the resulting crystals filtered, washed well with water and dried in vacuo. Recrystallization of the crude product from acetone-hexane furnishes the pure iodo compound possessing the following properties: M.P. about 173–175° (dec.); $[\alpha]_D^{23}+130°$ (c. 0.52 in chloroform);

$\lambda_{max.}^{Nujol}$ 2.95, 5.80, 5.86, 6.05, 6.20μ

EXAMPLE 7

21-Iodo-6α,9α-Difluoro-Δ¹,⁴-Pregnadiene-11β,16α,17α-Triol-3,20-Dione 16α,17α-Acetonide Following the procedure of Example 6, but substituting 250 mg. of 6α-fluorotriamcinolone 16α,17α-acetonide 21-mesylate for the 9α-fluoro-16α-hydroxyhydrocortisone 16α,17α-acetonide 21-mesylate, there is obtained 21-iodo-6α,9α-difluoro-Δ¹,⁴-pregnadiene-11β,16α,17α-triol-3,20-dione 16α,17α-acetonide.

EXAMPLE 8

21-Iodo-6α-Chloro-9α-Fluoro-Δ¹,⁴-Pregnadiene-11β, 16α,17α-Triol-3,20-Dione 16α,17α-Acetonide Following the procedure of Example 6, but substituting 250 mg. of 6α-chlorotriamcinolone 16α,17α-acetonide 21-mesylate for the 9α-fluoro-16α-hydroxyhydrocortisone 16α, 17α-acetonide 21-mesylate, there is obtained 21-iodo-6α-chloro-9α-fluoro-Δ¹,⁴-pregnadiene-11β,16α,17α-triol-3,20-dione 16α,17α-acetonide.

Similarly, but substituting the 21-mesylates of other 16α,17α-acetals or ketals for the triamcinolone acetonide 21-mesylate in Example 5 or the 9α-fluoro-16α-hydroxyhydrocortisone acetonide 21-mesylate in Example 6, the corresponding 21-iodo derivatives are formed.

EXAMPLE 9

16α-17α-Isopropylidene 9α,21-Difluoro-Δ¹,⁴-Pregnadiene-11β,16α,17α-Triol-3,20-Dione A mixture containing 1 gm. of triamcinolone acetonide 21-mesylate, 1 gm. of KF and 25 ml. of ethylene glycol is refluxed (180°) for 19 hours. The dark solution is poured into ice-water, extracted with chloroform and the chloroform extract washed with water, dried over sodium sulfate and evaporated to dryness in vacuo. The residue is recrystallized from acetone with the aid of charcoal. The pure fluoride after three crystallizations has the following properties: M.P. about 310°;

$\lambda_{max.}^{Nujol}$ 3.02, 5.78, 6.03, 6.20, 6.20μ

Analysis.—Calcd. for $C_{24}H_{30}O_5F_2$ (436.48): C, 66.04; H, 6.93; F, 8.59. Found: C, 65.64; H, 6.93; F, 7.81.

This compound possesses about 29 times the activity of cortisone in the rat liver glycogen assay and about 20 times the activity of hydrocortisone in the rat antiinflammatory assay.

EXAMPLE 10

*21-Chloro-9α-Fluoro-Δ$^{1,4}$-Pregnadiene-11β,16α17α-Triol-3,20-Dione 16,17-Acetonide*

A solution of 200 mg. of triamcinolone acetonide 21-mesylate and 900 mg. of lithium chloride in 25 ml. of dimethylformamide is kept at 100° for 24 hours. The mixture is poured on ice, extracted with chloroform and the chloroform extract washed with water and dried over sodium sulfate. Evaporation of the solvent in vacuo furnishes the crystalline chloride, which after recrystallization from acetone-ethanol has the following properties: M.P. about 310°.

*Analysis.*—Calcd. for $C_{24}H_{32}O_5FCl$ (454.96); C, 63.35; H, 7.09; Cl, 7.99. Found: C, 63.31; H, 6.83; Cl, 7.92.

When the lithium chloride in the above reaction is replaced by lithium bromide and the reaction is shortened to 12 hours there is obtained the corresponding 21-bromo derivative.

EXAMPLE 11

*6α,9α,21-Trifluoro-Δ$^{1,4}$-Pregnadiene-11β,16α,17α-Triol-3,20-Dione 16α,17α-Acetonide*

Following the procedure of Example 9, but substituting 1 g. of 6α-fluorotriamcinolone 16α,17α-acetonide 21-mesylate for the triamcinolone acetonide 21-mesylate, there is obtained 6α,9α,21-trifluoro-Δ$^{1,4}$-pregnadiene-11β,16α,17α-triol-3,20-dione 16α,17α-acetonide.

EXAMPLE 12

*6α-Chloro-9α,21-Difluoro-Δ$^{1,4}$-Pregnadiene-11β,16α,17α-Triol-3,20-Dione 16α,17α-Acetonide*

Following the procedure of Example 9, but substituting 1 g. of 6α-chlorotriamcinolone 16α,17α-acetonide 21-mesylate for the triamcinolone acetonide 21-mesylate, there is obtained 6α-chloro-9α,21-difluoro-Δ$^{1,4}$-pregnadiene-11β,16α,17α-triol-3,20-dione 16α,17α-acetonide.

Similarly by substituting the 21-mesylates of 16α,17α-(2'-butylidene) 6α-fluorotriamcinolone, 16α,17α(4'-methyl-2'-pentylidene) 6α-fluoro-triamcinolone, 16α,17α-cyclohexylidene 6α - fluorotriamcinolone, 16α,17α-ethylidene 6α - fluorotriamcinolone, 6α,9α - difluoro-16α-hydroxy-hydrocortisone acetonide, 6α-fluoro-9α-methyl-16α-hydroxyprednisolone acetonide, 6α,9α-difluoro-12α-methyl-16α-hydroxyhydrocortisone acetonide, 6α,9α - difluoro - -12α-methyl-16α-hydroxyprednisolone acetonide, the acetophenone derivative of 6α-fluorotriamcinolone, 16α,17α-benzylidene, 6α-fluoro-16α-hydroxyhydrocortisone, the alloxan derivative of 6α-fluorotriamcinolone, the dicyclopropyl ketone derivative of 6α-fluorotriamcinolone, 6α-fluoro-12α-chloro-16α-hydroxycortisone acetonide, 6α,12α-dichloro-16α-hydroxycortisone acetonide, 6α,12α-chloro-16α-hydroxyprednisone acetonide, 6α,12α-difluoro - 16α-hydroxyprednisolone acetonide, 6α,12α-difluoro-2α-methyl - 16α - hydroxyhydrocortisone acetonide, 16α,17α - trichloroethylidene, 6α-fluoro-12α-chloro-16α-hydroxycortisone, 16α,17α-(1,1,1-trifluoroisopropylidene) 6α-fluoro-12α-chloro-16α-hydroxycortisone, and 16α,17α - benzylidene, 6α,12α-difluoro-16α-hydroxyhydrocortisone for the triamcinolone acetonide 21-mesylate in Examples 9 and 10, the respective 21-fluoro and 21 chloro derivatives are obtained.

The invention may be variously otherwise embodied within the scope of the appended claims.

What is claimed is:

1. 6α-halotriamcinolone acetonide 21-(lower alkane) sulfonate.
2. 6α-fluorotriamcinolone acetonide 21-mesylate.
3. 6α-chlorotriamcinolone acetonide 21-mesylate.
4. 21-halo-6α,9α-difluoro-Δ$^{1,4}$-pregnadiene-11β,16α,17α-triol-3,20-dione 16α,17α-acetonide.
5. 21-halo-6α-chloro - 9α - fluoro-Δ$^{1,4}$-pregnadiene-11β,16α,17α-triol-3,20-dione 16α,17α-acetonide.
6. 6α,9α,21 - trifluoro-Δ$^{1,4}$-pregnadiene - 11β,16α,17α-triol-3,20 dione 16α,17α-acetonide.
7. 6α-chloro-9α,21-difluoro-Δ$^{1,4}$-pregnadiene - 11β,16α,17α-triol-3,20-dione 16α,17α-acetonide.
8. A compound selected from the group consisting of steroids of the general formulae

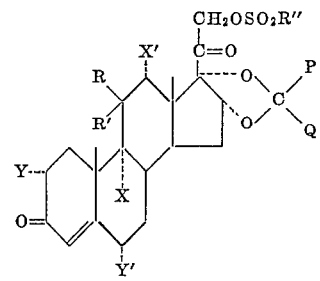

and

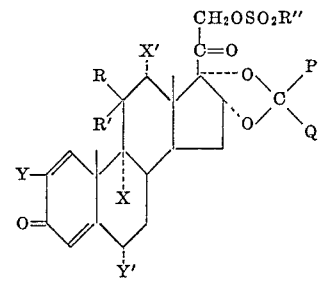

wherein R is hydrogen, R' is β-hydroxy and together R and R' is keto; R" is selected from the group consisting of p-tolyl and lower alkyl; X and X' are selected from the group consisting of hydrogen, halogen and lower alkyl, at least one X being selected from the group consisting of hydrogen and lower alkyl; Y is selected from the group consisting of hydrogen and methyl; Y' is halogen; P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon to which they are joined P and Q is selected from the group consisting of cycloalkyl and monocyclic heterocyclic.

9. A compound selected from the group consisting of steroids of the general formulae

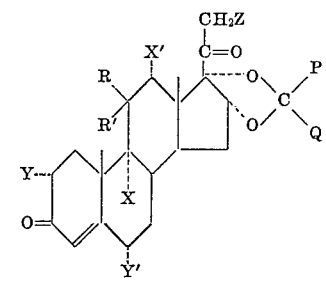

and

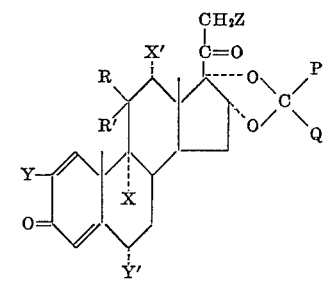

wherein R is hydrogen, R' is β-hydroxy and together R and R' is keto; X and X' are selected from the group consisting of hydrogen, halogen and lower alkyl, at least one X being selected from the group consisting of hydrogen and lower alkyl; Y is selected from the group consisting of hydrogen and methyl; Y' and Z are halogen; and P and Q are selected from the group consisting of hydrogen, lower alkyl, halogenated lower alkyl, monocyclic cycloalkyl, monocyclic aryl, monocyclic aryl lower alkyl, monocyclic heterocyclic and monocyclic heterocyclic lower alkyl and together with the carbon to which they are joined P and Q is selected from the group consisting of cycloalkyl and monocyclic heterocyclic.

10. A process for preparing a steroid of claim 8 which comprises interacting the corresponding steroidal compound selected from the group consisting of steroids of the general formulae

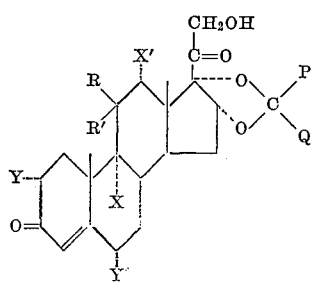

and

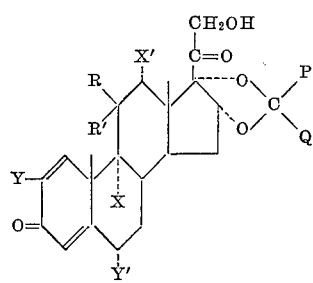

wherein R, R', X, X', Y, Y', P and Q are as defined in claim 8, with a compound selected from the group consisting of a lower alkane sulfonyl halide and p-toluene sulfonyl halide under substantially anhydrous conditions, and recovering the steroid formed.

11. A process for preparing a steroid of claim 9, which comprises interacting the corresponding steroidal compound selected from the group consisting of steroids of the general formulae

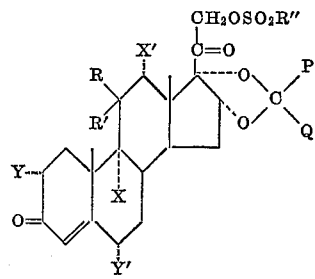

and

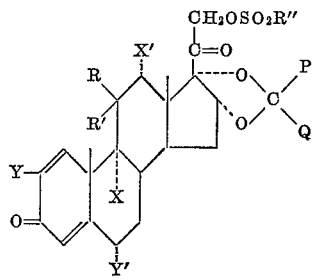

wherein R is hydrogen, R' is β-hydroxy and together R and R' is keto; R" is selected from the group consisting of p-tolyl and lower alkyl; X and X' are selected from the group consisting of hydrogen, halogen, and lower alkyl, at least one X being selected from the group consisting of hydrogen and lower alkyl; Y is selected from the group consisting of hydrogen and methyl; Y' is halogen; P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon to which they are joined P and Q is selected from the group consisting of cycloalkyl and monocyclic heterocyclic; with a metal halide at an elevated temperature under substantially neutral conditions, and recovering the steroid formed.

References Cited in the file of this patent
UNITED STATES PATENTS 2,838,542    Spero et al.              June 10, 1958
2,903,449    Fried et al.               Sept. 8, 1959